US008561118B2

(12) United States Patent
Flynn-Ripley et al.

(10) Patent No.: US 8,561,118 B2
(45) Date of Patent: Oct. 15, 2013

(54) APPARATUS AND METHODS FOR TV SOCIAL APPLICATIONS

(75) Inventors: Meredith Flynn-Ripley, Lexington, MA (US); Nimrod Gal-Oz, Lehavim (IL); Giora Keinan, Rishon LeZion (IL)

(73) Assignee: MediaFriends, Inc., Cambridge, MA (US)

( * ) Notice: Subject to any disclaimer, the term of this patent is extended or adjusted under 35 U.S.C. 154(b) by 344 days.

(21) Appl. No.: 12/534,939

(22) Filed: Aug. 4, 2009

(65) Prior Publication Data

US 2010/0037277 A1  Feb. 11, 2010

Related U.S. Application Data

(60) Provisional application No. 61/137,918, filed on Aug. 5, 2008, provisional application No. 61/164,705, filed on Mar. 30, 2009.

(51) Int. Cl.
*H04N 7/173* (2011.01)
*H04N 7/10* (2006.01)
*H04N 7/025* (2006.01)

(52) U.S. Cl.
USPC .............. 725/109; 725/32; 709/204; 715/758

(58) Field of Classification Search
USPC .................................... 725/109, 32
See application file for complete search history.

(56) References Cited

U.S. PATENT DOCUMENTS

| | | | |
|---|---|---|---|
| 7,010,312 B1 * | 3/2006 | Zechlin | .......................... 455/466 |
| 7,343,168 B2 | 3/2008 | Valloppillil | |
| 7,499,704 B1 | 3/2009 | Bonner | |
| 7,860,525 B2 | 12/2010 | Parkkinen et al. | |
| 7,865,198 B2 | 1/2011 | Shin | |
| 2002/0144273 A1 * | 10/2002 | Reto | ................................ 725/86 |
| 2003/0078972 A1 * | 4/2003 | Tapissier et al. | ............... 709/204 |
| 2003/0226143 A1 * | 12/2003 | Michael et al. | ................... 725/32 |
| 2004/0023641 A1 * | 2/2004 | Tsutsumi et al. | ............. 455/411 |
| 2004/0109452 A1 | 6/2004 | Takihiro et al. | |
| 2005/0108334 A1 * | 5/2005 | Tam et al. | ...................... 709/206 |
| 2005/0288045 A1 | 12/2005 | Yang et al. | |
| 2006/0115062 A1 * | 6/2006 | Gonder et al. | ............ 379/142.01 |
| 2006/0130120 A1 * | 6/2006 | Brandyberry et al. | ......... 725/136 |
| 2006/0142012 A1 | 6/2006 | Kirchhoff et al. | |

(Continued)

FOREIGN PATENT DOCUMENTS

| | | | |
|---|---|---|---|
| WO | WO 02/32134 | * | 4/2002 |
| WO | WO 0232134 A1 | * | 4/2002 |

*Primary Examiner* — Robert Hance
(74) *Attorney, Agent, or Firm* — Chapin IP Law, LLC

(57) ABSTRACT

A system for implementing a content-centered chat room operates to display messages received from one or more invitees of a subscriber on the subscriber's TV as program content is displayed on the subscriber's TV. The subscriber and the invitees all watch television, either a common TV program or different TV programs. Participants may be located in the same or in several different locations, and if the invitee-participants are also subscribers, the chat room may also appear on their TV screens. A subscriber invites friends to participate in the chat session for a specific TV program using the set top box (STB) of his television to send invitations, and a dedicated subscriber server coordinates notification of the invitees and directs their message-comments to a chat session displayed with the program content. In one embodiment, participants or the participants who are not also subscribers of the TVChat service or whose televisions are otherwise not chat-enabled, may receive other participants' chat messages by mobile phone.

22 Claims, 1 Drawing Sheet

(56) References Cited

U.S. PATENT DOCUMENTS

| | | |
|---|---|---|
| 2007/0066318 A1 | 3/2007 | Danzeisen et al. |
| 2007/0094691 A1* | 4/2007 | Gazdzinski ............... 725/62 |
| 2008/0256586 A1* | 10/2008 | Illgner-Fehns et al. ....... 725/118 |
| 2008/0263137 A1 | 10/2008 | Pattison et al. |
| 2011/0047487 A1* | 2/2011 | Deweese et al. .............. 715/758 |

* cited by examiner

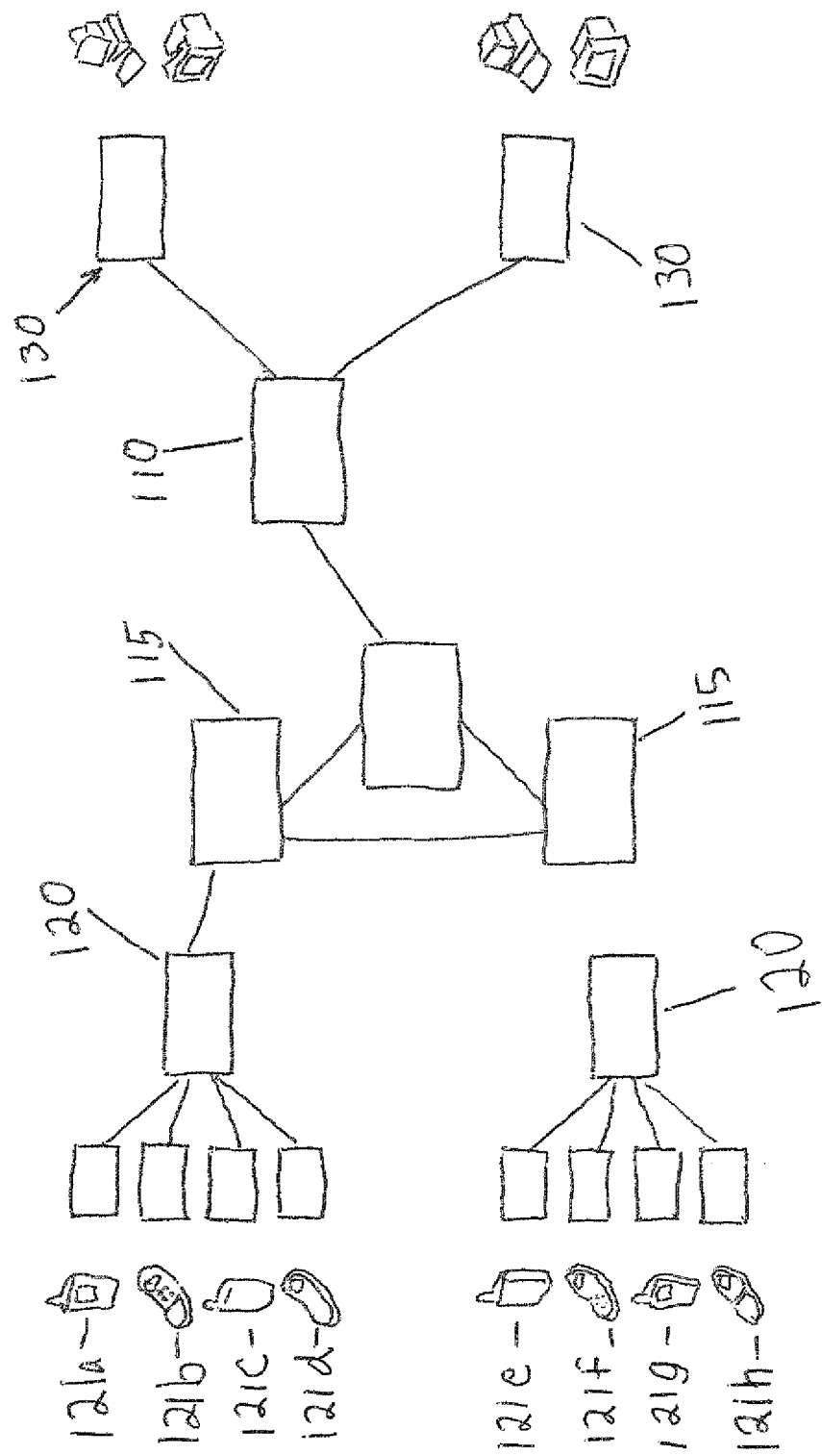

APPARATUS AND METHODS FOR TV SOCIAL APPLICATIONS

RELATED APPLICATIONS

This application claims the benefit of U.S. provisional patent application Ser. Nos. 61/137,918, entitled "Apparatus and methods for TV social applications", filed Aug. 5, 2008, and 61/164,705, entitled "SMS Technology for Computerized Devices", filed Mar. 30, 2009, the entire contents of which are incorporated herein in their entireties.

BACKGROUND

Social networking is a recent phenomenon that has been growing rapidly in the consumer electronics market. This rapid growth is fueled by the large number of household PCs with high speed internet, as well as growing number of smart mobile devices. For many, posting a picture, a message or a blog, or receiving a notification of a social networking group has become a norm and part of everyday communications. The emergence of social media and short message service (SMS) or multimedia messaging service (MMS) are now fueling a new generation of experience across PCs, mobile and landline phones.

However, the TV remains noticeably absent from social networking. To "chat" about video programming being watched, subscribers would have use their PC or mobile phone to join an online community of other PC users (e.g. via a chat room or instant messaging), or participate in one-to-one voice or text messaging using their mobile phone. In the event that the user wanted to share comments and make observations about a TV show with a group of friends, they would all have to bring their computer or mobile phone, perhaps running a social networking application, alongside the TV. This behavior of watching the TV and computer or mobile phone screen simultaneously is awkwardly disjointed.

Among the forms of social messaging with personal electronic devices now common in the market are IM (instant messaging) and text messaging, transmitted by one mobile phone to another, and also internet or web-based chat sessions, in which plural users can log into a chat room and type their text messages, carrying on something like a written group discussion. Several protocols such as MMS (multimedia messaging service) and SMS enable reliable transmission of short messages in different formats. Internet chat rooms may be organized about a theme, about specific subject matter, or otherwise, and often serve as a locus for exchange of information or advice. A chat room may also simply constitute a virtual space for 'hanging out' with on-line friends.

The foregoing social messaging systems allow users to express themselves either to one other person (in the case of mobile phone messaging), or to several other people. In the latter case, the others may be strangers, or persons known only as internet personae through the communications they have chosen to post on the web. In addition certain software applications allow a user to see whether a selected list of friends who are also running the software, happen to be on-line, and, if so, to exchange messages.

All these forms of social messaging are quite popular, but each has certain limitations as noted above. It would therefore be desirable to provide a social communication system of greater richness.

SUMMARY OF THE INVENTION

A system and method of the present invention provides content-centered social communication such that subscriber-selected participants transmit messages in a session coordinated with program content and the messages are displayed as the program content is viewed on a subscriber's TV.

An embodiment of the system includes a device for selection of invitee-participants, the device operable with the subscriber's TV for selecting the participants from a display on the subscriber's TV.

A further embodiment of the system organizes the display as a subscriber address book of individuals and/or buddy groups, including face shots or other personalized identifiers, and the subscriber initiates the session from his TV by commands on the controller to select a TV program and select invitees from the display.

In an embodiment of the system the subscriber-selected participants transmit messages by mobile messaging device, and the system includes a server operative to coordinate transmission of invitations to participants and routing of messages received from the participants to the subscriber's TV.

An embodiment of the system includes a set top box (STB) of the subscriber programmed to display invitee and chat data, and operative to send invitee selection data to the server and to display on the subscriber TV, the messages received from participants as the selected program content is shown.

A further embodiment of system the server includes a database including the subscriber address book, and such that the server
   i) operates in response to invitee selection data received from the subscriber's STB to send program chat invitations to the invitees selected by the subscriber; and
   ii) directs messages received from the participants to the subscriber's STB for chat room display, e.g., as time-ordered scrolling text with sender identifier.

An embodiment of the system includes a subscriber initially entering the address book in the server or a database accessible to the server, by PDA, mobile phone, computer entry or the like, and subsequently designating invitees for a chat session by selecting invitees from a display on the subscriber's TV.

In another embodiment of the system the invitations are cross-platform invitations sent to an invitees TV, land line, PC, mobile phone or other device.

An embodiment of the system includes a subscriber STB which operates to display visual frames or sub-frames, pictures and the like on the subscriber TV having message and identifier data content received from the server.

An embodiment of the system is implemented as a service offering to subscribers of at least one broadband TV provider, such that the messages are displayed on the TVs of participants who are also subscribers.

In an embodiment of the system the server coordinates with the subscriber's TV service provider to effect transmission of received messages to the STB for display as the program is running.

An embodiment of the system is a social messaging system for interconnecting a subscriber and plurality of participants to chat or exchange text or other messages, such that the subscriber, from the subscriber's TV, invites the participants to view a TV program and such that the messages sent by the participants are displayed with the program as the subscriber watches TV and the subscriber and participants exchange chat while viewing the program.

In an embodiment of the system the subscriber selects or invites participants from a buddy group address list maintained for the subscriber on a system server, and the server operates to notify invitees by mobile phone or other messaging mode and to coordinate display of messages received from participants on at least the subscriber's TV during a chat session as the TV program is being viewed by the invitees at separate locations or the same location.

A further embodiment of the system includes a set top box (STB) configured to display messages and participant data on-screen during program viewing, such that the server coordinates with the subscriber's TV service provider to effect transmission of received text or other messages to the STB for display as the program is running.

In a further embodiment of the system the program is scheduled TV programming or is video-on-demand.

An embodiment of the system is a social messaging system including a dedicated server configured to coordinate messaging between a subscriber and a plurality of invitees designated by the subscriber, an STB configured to display a chat window and messages received from the invitees overlaid on television content on a TV of the subscriber, such that the dedicated server interfaces with an inter-carrier message relay service and with the subscriber's broadband TV provider to provide messages from the plurality of invitees to the STB for display during a chat session arranged by the subscriber such that the subscriber may invite designated persons to share messages while they separately view TV.

An embodiment of the invention is a content-centered social messaging system such that a chat session is constituted by mobile phone/PDA messages of plural invitees displayed on a subscriber's television during display of television program content such as a sports event, a drama or the like, such that a dedicated server invites subscriber-designated users to view the television program and to send messages, and the server coordinates transmission of messages received from the subscriber-designated users to an STB associated with the subscriber to enable the simultaneous display of a chat session with the program content on the subscriber's TV as the invitees view the same program content at one or more locations remote from the subscriber.

In a further embodiment of the content-centered social messaging system the server maintains address lists for the subscriber including messaging contact address or phone, and arranges for the transmission of the chat session messages to at least some participants during a chat session.

In an embodiment of the content-centered social messaging system the server maintains messaging contact addresses for the subscriber and the system coordinates on-screen display of chat session messages on the subscriber's and on at least some participants' television.

In an embodiment of content-centered social messaging system the subscriber moderates admission to the chat session.

The subscriber and participants in an embodiment of the content-centered social messaging system share an educational or other affinity or interest in the program content such as i) class students viewing a play or other assignment
ii) colleagues viewing a documentary of professional interest
iii) alumni viewing college sports or city-affiliated event program
iv) friends who enjoy watching entertainment together, or
v) a relationship.

In a further embodiment of the content-centered social messaging system the server auto-provisions invitees who are not included in a PC based address book or do not have access to the PC based address book through non-PC devices, such that the devices are selected from the group of the TV, set top, mobile device or landline device.

BRIEF DESCRIPTION OF THE DRAWINGS

FIG. 1 shows an embodiment of the system in which a dedicated server 110 interfaces with one or more telephone message-handling services or inter-carrier vendor (ICV) hubs 115, and with one or more cable operators or broadband TV providers 130 to arrange and enable a television program chat session in which invitees participate using mobile phones 121*a*-121*h*.

DETAILED DESCRIPTION

The invention will now be described with reference to a presently preferred embodiment, wherein a user-subscriber employs the set top box (STB) of his TV to invite friends to a TV content-centered chat session, i.e., to send their comments while viewing a designated TV program, such as a ball game or a TV reality show. The invitees send comments via mobile phone, and the comments are displayed on at least the subscriber's TV. As further described below, this is effected with a dedicated subscriber server which maintains certain information and coordinates communications, and involves some programming or hardware implementation in the subscriber's STB to provide a graphic user interface (GUI) for sending invitations and for monitoring or controlling the session, as well as a connection with the subscriber's broadband or TV provider.

In the description below, while the term TV or television is used for the illustrative example, the term "TV" is understood in appropriate circumstances to include a computer monitor or other display device. Generally the relevant consideration for a "TV" is that the device be used for the display of programming content, such as a movie, drama, event or other content that is simultaneously but separately viewable by all participants in the chat session. Thus, while computers presently do not have scheduled television programming, in a computer-based TV system the computer would be a "TV", and the channel selection, display and chat room functionality could all be included in the computer itself. In that case, both "TV" and "STB" would then refer to the computer itself. Further, the invention is not limited to prescheduled television programming, but with appropriate coordination among users, may include TVs displaying video on demand (VOD) to the participants.

Furthermore the term "set top box" or STB is understood to include analogous portions of a computer application and display software and/or hardware (when a computer is used to display the common content or television programming), or of the TV when such capability is built into the TV or display unit. The relevant attributes of the STB is that it select, demodulate or otherwise enable or control the TV to display program content, and further that it contain, or be programmed to operate, such that visual frames or sub-frames, pictures and the like of a chat session are displayed on the computer monitor or TV, and receive data and meta-data that it uses to select these auxiliary displays and insert the message text and/or mixed media; and generally also that it be able to send some control or data signals. The term STB is also understood to include game consoles such as sold by Nintendo, Microsoft or the 'PlayStation' consoles sold by Sony Corporation, which function as set top boxes and may be programmed to perform the display and communication functions described herein to implement content-centered chat or social networking sessions. In addition it is noted that the operation described below involves certain coordination between the STB and a server which coordinates invitation messages and chat messages with the subscriber's TV. In TVs or devices provisioned according to the "Tru2Way™" or EBIF specification, i.e., with Tru2Way™ middleware or an EBIF environment, the functionality of the STB is embodied in the TV itself, and the dedicated server may interact directly through the video service provider company connection with the subscriber's TV, DVD player etc.

Similarly, while the invention is described for clarity as involving the collection and display of text messages, in other embodiments the messages received from invitees may be mixed media messages, instant messages, voice messages, or voice-over-digital messages, and the display of such messages may include establishing a video sub-frame within the chat graphics, or establishing a computer or mobile phone voice or conference line such that the invitees are able to speak with each other while all viewing the same TV program. Preferably, however, the chat format is followed, with scrolling or otherwise displayed text messages that can be overlaid on the viewing screen without distracting from the sound or the video of the program content.

Operation of such a system will be understood from FIG. 1, showing operative elements and their relationships in the context of existing mobile telephone and television communications provider companies. As shown a dedicated server 110 interfaces with one or more telephone message-handling services or inter-carrier vendor (ICV) hubs 115, and with one or more cable operators or broadband TV providers 130 to arrange and enable a television program chat session. The ICVs send invitations to a plurality of invitees to invite them to join the TV chat session during a designated TV program, and receive and forward all replies and comments sent as messages by the invitee/participants via their mobile phones 121*a*, 121*b* . . . for the dedicated chat session. The TV providers 130 provide the message content relayed by the dedicated server 110 to the televisions and set top boxes of their respective chat-TV subscribers who are participating in the specific session, either as the initiating subscriber, or as invited participants who have subscribed to chat-enabled TV. The subscribers may be subscribers with several different cable operators or broadband providers, such as Comcast, Direct TV, Verizon, and the server 110 preferably connects to each of the carriers by a dedicated hub.

Operation will now be discussed for a single subscriber. As described further below, the content-based TV chat sessions of the present invention are preferably initiated and managed by the subscriber on the subscriber's TV. Initially, invitees are selected by the subscriber from the subscriber's buddy groups or address list, as displayed in a graphic user interface on the subscriber's TV. For this purpose the necessary data—names and phone or device addresses—are preferably initially downloaded to or otherwise entered in the dedicated server 110 by the subscriber, and may be managed on the subscriber's PC. In various embodiments the provision of or managements of address lists and buddy groups on the server may be effected through cross-platform communications—e.g., by PC entry, mobile phone entry, land line or via another device. The STB displays selection options to allow the user to select particular invitees, for example using the remote on the subscriber's TV. The server then coordinates sending invitations to the selected invitees to join a chat session associated with a particular program. In further embodiments, to deal with situations wherein the subscriber wishes to invite a new person not presently in his address book, the system may also include a self-provisioning feature wherein an additional person may be sent an invitation to join a group, and/or sent an invitation and contact data to enable that person to register his mobile phone or other messaging device for the TVChat session.

In various embodiments the system is implemented with a standards-based architecture to effect communications applications across TVs, PCs, and mobile and land line phones with no new equipment or software required within the home. This approach works in cable, IPTV, and hybrid video and telephony networks and supports technology architectures including IP Multimedia Subsystem (IMS), tru2way and Etv Binary Interchange Format (EBIF). The flexibility of the platform also allows operators to embed advanced subscriber-managed features, such as personalization (photos and nicknames), active call control and i-Click™ (software implemented one-button click-to-call telephony) into any compatible equipment, for example STBs, suitably equipped game consoles or the like.

Continuing with a discussion of a TV chat session, a subscriber using their remote control, can invite individuals or groups to watch TV programming together or enable a chat session independent of TV programming. Buddies can accept or decline the invitation; if they accept, their TV automatically tunes to that channel, and a live group chat is visible on the screen. Buddies override automatic channel selection and remain on their existing channel at their option. Viewers can then participate in the group chat by sending text messages via their mobile phone to the phone number displayed on the chat banner.

In an embodiment of the system the graphic user interface (GUI) is effected by software, including a component loaded in the user's STB which displays the user's buddy groups, address groups or friends names, images or other identifier, such that the user may select invitees using the remote control to invite people in the user's online community to join watching the same programming or separate programming. Participants then "chat" (send text messages) to the group and their conversations are displayed with the programming they are watching. The system enables subscribers to invite and participate in a chat session within a particular scheduled programming or separate programming. In one initial embodiment, screen displays support the following features:

- invite hot key—this feature allows a subscriber to invite 1 group of friends or 1
- individual friend—no multiple selection;
- invite individual friends during the session;
- accept or ignore an invitation (preferably does not send a message back in any case), if accept—auto tune to the channel or remain on the current channel;
- a TVChat session is bound to a channel if the chat session is on the same programming, when switching to another channel, only a small icon with the channel number remains displayed;
- a TVChat session is not bound to a channel if the chat session is programming independent; when switching to another channel the chat session remains on screen regardless of the channel switch, during chat:
  - post messages via SMS (to a common number);
  - invite more friends (individual);
  - minimize TVChat display;
  - show/hide participants list;
  - exit (With confirmation);
- display last X messages in the TVChat (wherein X is configurable, and depends on the client);
- 70% video, 30% chat window screen space allocation or other configurable ratios of video to chat screen space dependent upon content, operator or consumer preferences;
- reports and statistics;
- direct connection to ICV.

In an embodiment of the system a single household has multiple profiles and multiple TVChat sessions. Optionally a subscriber: changes his or her screen name, requests to join an existing TVChat session, or displays who is online. The subscriber also can suspend invites with a "Snooze" feature, control the location of the TVChat banner, actively scroll TVChat messages, and display a screen saver. In this embodiment the screen displays are arranged with a TVChat icon (identified with a MediaFriends trademark) and on screen buttons enabled in accordance with certain states of preconditions. For example, the MediaFriends Icon is presented if the subscriber is licensed for TVChat, and the TV provider/Operator 130 enabled the TVChat promotion feature.

In various embodiments of the system the program flow is such that on every change channel action performed by the subscriber, the Media☺Friends icon is presented on the TV screen. For example, in an embodiment of the system: the subscriber changes the TV channel using the remote and then remains on the channel for at least 10 seconds; the Media friends icon appears on the screen (See FIG. 1); and the subscriber can press the hotkey associated with the icon to launch the friends selection screen.

In an alternate embodiment the system is programmed to allow the operator to remove the icon after it is initially displayed. In this case the icon will be presented again on the next channel change. The operator may also be able to enable or disable promotion feature for specific channels. In order for a subscriber to invite friends to chat it is necessary that the subscriber be licensed for the TVChat service and that the operator 130 have enabled the TVChat service. This will be generally assumed herein when referring to a person as a "subscriber". Action is initiated if the subscriber has pressed the hotkey and launched the application, and the subscriber has added friends to the friends list.

In this embodiment of the system the program flow is such that when pressing a predefined hot key on the remote control, the subscriber launches the TVChat application, then chooses a group or an individual friend from the friends list and invites them to a TVChat session. For example: the subscriber presses the TVChat hotkey on the remote control; the subscriber's friend list is presented; the subscriber chooses one group of friends from the list; an invitation to all the members in the selected group is sent; the subscriber receives an invite confirmation message; and the subscriber's TVChat main screen appears.

In alternative embodiments of the system other program flows are possible. For example, the subscriber chooses to invite an individual friend, by pressing the button "A" and receiving the individual friend's selection screen. Choosing a friend and pressing the "Select" button sends an invitation to that selected friend only. In the event the invitation process fails, i.e., the dedicated server 110 is not able to initiate invitations to the selected group or to the selected friend for any reason, the screen presents an error message and does not launch TVChat screen. If the subscriber does not have any friends in the friend list: the friend's selection list is presented empty. If the subscriber does not choose any action the friends selection list screen is removed after the screen's Time To Live (TTL) expires. When removing the screen, the TVChat promotion icon is presented instead.

In various embodiments of the system TVChat Invitations are sent as regular mobile phone messages to the invitees, and in some embodiments cross-platform invitations are sent, e.g., to the invitee's land line, PC or other communication device. However, in other embodiments of the system at least some invitees also subscribe to the TVChat service with the same or a different TV provider or cable operator 130, and in that case their invitations are sent to and displayed upon the television sets of those subscribers. When a TVChat invite is sent to such a subscriber, then the basic program flow is that the subscriber is invited to a TVChat session and accepts the invitation on his TV which is then automatically tuned to the TVChat associated channel, or optionally remains tuned to the existing channel, where the subscriber-participant is able to see posted messages and post new messages to the TVChat. For example: the subscriber receives an invitation to join TVChat from one of the media friends; the subscriber chooses to accept the invite; and the subscriber is automatically tuned to the channel specified in the invitation or optionally remains on the existing channel. In this example the subscriber is joining the TVChat session, and will be able to see newly posted messages to the TVChat.

Alternative embodiments of the program flow include the following:
  when no picture is associated with the inviter, present the default TVChat icon instead of a picture;
  if the subscriber chooses to reject the invitation, remove the invite from the TV screen;
  if there are multiple invites, the most recent invite is presented and previous invites are not presented;
  if the subscriber has multiple TV clients and the invite was accepted in one of the clients, the invitation will be immediately removed from the rest of the TV clients;
  if the TVChat has exceeded its maximum number of participants, any subscriber attempting the join the TVChat receives an error message that states the TVChat is too full;
  if an invite appears for a subscriber and a TVChat session already exists in the household, when choosing to accept, the current TVChat session is closed, the subscriber is automatically tuned to the channel associated with the new invite, or optionally remains on the existing channel, and a new TVChat session is started on the new channel or the existing channel. Any additional clients that received the invite (while TVChat exists for another client) and choose to accept it will get an error message that states that only 1 TVChat session is available for the household;
  if an invite is received when another realtime notification, such as CallerID, is displayed, as an invite usually has a longer TTL, the invite is presented in the background, and becomes visible when the real time notification is dismissed (whether by timing out or by the subscriber);
  if the subscriber does not choose any activity the invite is removed after X seconds (where X is a configurable parameter which can be changed by the subscriber).

In a further embodiment, the subscriber temporarily suspends, for example using a Snooze feature, the TVChat invites, and further, when the subscriber receives multiple invites, the pages through them and selects the TVChat he wants to join.

In various embodiments, the STB or its equivalent TV or game console functionality is programmed or configured to make available necessary information and control options to the user during a chat session. Such features may include special graphic buttons to cause the attendee list to display, to scroll back through messages, to display chat operating instructions, and other information requirements or housekeeping tasks. In addition certain information may be displayed for brief intervals, such as when a new invitee joins, when an invitees declines to join, or is busy in another chat session, and various confirmation messages—that an invitation has been sent or received. In general the STB or it's functional equivalent is programmed to provide the displays appropriate for data entry, Control-M selection, chatting, session monitoring and other activities, such that to the extent possible the subscriber may perform all current activities directly on his TV or with his set top box. When subscribers send in their chat messages via their mobile phone or PC, the message is delivered from their wireless provider or ISP to the Short Message Service Center (SMSC). Using the Inter-Carrier Vendors (ICV), the message is delivered to the dedicated system server through the system gateway, thus providing a single connection to the inter-carrier vendors while providing access to all of the cable system providers (CSPs) in the customer premises. In another embodiment the system is implemented with a direct connection between the ICVs and the several CSPs, but the use of a dedicated server generally provides better coordination for the scheduling and display of chat which must coordinate with the simultaneous viewing of program content.

The invention being thus disclosed and illustratively described, variations and modifications thereof will occur to those skilled in the art, and all such variations and modifications are considered to be within the scope of the invention as defined by the claims appended hereto.

What is claimed is:

1. A system for content-centered social communication comprising:
    a dedicated server configured to coordinate messaging between a subscriber and a plurality of invitees designated by the subscriber, the dedicated server comprising:
        an interface to an inter-carrier vendor (ICV) hub;
        an interface to at least one broadband provider to provide messages from the plurality of invitees to a subscriber set top box (STB);
    an STB application operable to display messages from the plurality of invitees as program content is viewed on a subscriber TV;
    wherein the dedicated server is operative to coordinate transmission of invitations to the plurality of invitees and routing of messages received from the plurality of invitees to the subscriber TV via a provisioned virtual telephone number associated with the subscriber STB;
    wherein the plurality of invitees transmit SMS text messages through the ICV hub using the provisioned virtual telephone number by at least one mobile messaging device;
    wherein the provisioned virtual telephone number is displayed on at least one banner of at least one TV of at least one of the plurality of invitees;
    wherein the message from the at least one mobile messaging device is delivered to the dedicated server using the ICV hub and the provisioned virtual telephone number; and
    wherein the message is at least one of: a Multimedia Message Service (MMS) message, a Short Message Service (SMS) text message, and an Instant Messaging format message.

2. The system of claim 1, comprising a set top box (STB) of the subscriber, programmed to display invitee and chat data, and operative to send invitee selection data to the dedicated server and to display on the subscriber TV, the message received from at least one of the plurality of invitees as selected program content is shown.

3. The system of claim 1, wherein the dedicated server includes a database comprising a subscriber address book, wherein the dedicated server i) operates in response to invitee selection data received from the subscriber STB to send program chat invitations to the invitees selected by the subscriber; and
ii) directs messages received from the plurality of invitees to the subscriber STB for chat room display.

4. The system of claim 1, wherein the subscriber initially enters an address book in one of:
    the dedicated server;
    a database accessible to the dedicated server, by one of:
    a PDA;
    a mobile phone; and
    a computer entry; and subsequently designates invitees for a chat session by selecting the invitees from a display on the subscriber TV.

5. The system of claim 1, wherein the invitations are cross-platform invitations sent to one of:
    an invitee TV;
    a land line;
    a PC;
    a mobile phone; and
    a communication device.

6. The system of claim 4, wherein the subscriber STB operates to display on the subscriber TV having message and identifier data content received from the dedicated server one of:
    visual frames;
    sub-frames; and
    pictures.

7. The system of claim 5, wherein the system is implemented as a service offering to subscribers of at least one broadband provider, and wherein the messages are displayed on TVs of the plurality of invitees who are also subscribers of the broadband provider.

8. The system of claim 4, wherein the dedicated server coordinates with the broadband provider to effect transmission of received messages to the STB for display as the program is running.

9. The system of claim 1, wherein a chat session is constituted by mobile phone/PDA messages of plural invitees displayed on a subscriber television during display of television program content; and
    wherein a dedicated server invites subscriber-designated users to view the television program and to send SMS text messages via the inter-carrier vendor (ICV) hub using a provisioned virtual telephone number, and the dedicated server coordinates transmission of messages received from the plurality of invitees to the subscriber STB to enable simultaneous display of a chat session with the program content on the subscriber TV as the plurality of invitees view same program content at least one location remote from the subscriber.

10. The system of claim 9 wherein the dedicated server maintains address lists for the subscriber including one of:
    a messaging contact address; and
    a phone number; and
    arranges for transmission of chat session messages to at least one of the plurality of invitees during a chat session.

11. The system of claim 9 wherein the dedicated server maintains messaging contact addresses for the subscriber and the system coordinates on-screen display of chat session messages on the subscriber TV and at least one TV of the plurality of invitees.

12. The system of claim 9 wherein the subscriber moderates admission to the chat session.

13. The system of claim 9 wherein the subscriber and the plurality of invitees share one of:

an educational interest in the program content; and
an affinity interest in the program content selected from at lest one of:
   class students viewing an assignment;
   colleagues viewing a documentary of professional interest;
   alumni viewing college sports;
   friends who enjoy watching entertainment together; and
   a relationship.

14. The system of claim 9 wherein the dedicated server auto-provisions invitees who are one of:
   invitees not included in a PC based address book; and
   invitees who do not have access to the PC based address book through non-PC devices; and
   wherein the devices are one of:
   a TV;
   a set top box;
   a mobile device; and
   a landline device.

15. The system of claim 3 wherein the chat room display includes time-ordered scrolling text with a sender identifier.

16. The system of claim 1 wherein the interface to the broadband provider is one of:
   a Tru2Way interface; and
   an ETV Binary Interchange Format (EBIF) interface.

17. The system of claim 1, wherein the transmission of invitation functionality of the STB is embedded in one of:
   a TV;
   a DVD player; and
   a game console.

18. The system of claim 1, wherein the dedicated server interfaces with an ICV hub message relay service and with the broadband provider to provide messages from the plurality of invitees to the subscriber STB for display during a chat session arranged by the subscriber; and
   whereby the subscriber invites designated persons to share messages while the subscriber and the designated persons separately view TV content.

19. A social messaging system for interconnecting a subscriber and a plurality of participants to chat comprising:
   a dedicated server configured to coordinate messaging between the subscriber and a plurality of participants designated by the subscriber, the dedicated server comprising:
      an interface to
         an inter-carrier vendor (ICV) hub;
      an interface to at least one broadband provider to provide messages from the plurality of participants to a set top box (STB);
   a STB application operable to display messages from the plurality of participants;
   wherein the dedicated server is operative to coordinate transmission of invitations to the plurality of participants and routing of messages received from the plurality of participants to the subscriber TV via a provisioned virtual telephone number associated with the subscriber STB;
   wherein the plurality of participants transmit SMS text messages through the ICV hub using the provisioned virtual telephone number by at least one mobile messaging device;
   the system further comprising a central router comprising a table for registering and associating the provisioned virtual telephone number with a MAC address and an IP address of the STB,
   wherein the provisioned virtual telephone number is displayed on at least one banner of at least one TV of one of the plurality of participants; and
   wherein the message from the at least one mobile messaging device is delivered to the STB having the IP address and the MAC address associated with the provisioned virtual telephone number;
   wherein the plurality of participants designated by the subscriber communicate through a plurality of wireless operators to the dedicated server using the displayed provisioned virtual telephone; and
   wherein the message is at least one of:
      a Multimedia Message Service (MMS) message;
      a Short Message Service (SMS) text message; and
      an Instant Messaging format message.

20. The system of claim 19, wherein the subscriber selects or invites participants from a buddy group address list maintained for the subscriber on the dedicated server, and the dedicated server operates to notify the plurality of participants by mobile phone and to coordinate display of messages received from participants on the subscriber TV during a chat session as a TV program is being viewed by the plurality of participants at one of:
   separate locations; and
   the same location.

21. The system of claim 20, comprising a set top box (STB) configured to display messages and participant data on-screen during program viewing, and wherein the dedicated server coordinates with the broadband provider to effect transmission of received text to the STB for display as the program is running.

22. The system of claim 19, wherein the subscriber, from the subscriber TV, invites the plurality of participants to view a TV program and wherein the messages sent by the plurality of participants are displayed with the program as the subscriber watches TV whereby the subscriber and plurality participants exchange chat message while viewing the program.

* * * * *